(12) United States Patent
Tirkkonen

(10) Patent No.: US 9,567,148 B2
(45) Date of Patent: Feb. 14, 2017

(54) PRODUCT OR PREPARING FOOD

(75) Inventor: Tapani Tirkkonen, Kortteinen (FI)

(73) Assignee: Sinituote Oy, Hyvinkaa (FI)

( * ) Notice: Subject to any disclaimer, the term of this patent is extended or adjusted under 35 U.S.C. 154(b) by 3 days.

(21) Appl. No.: 12/660,040

(22) Filed: Feb. 18, 2010

(65) Prior Publication Data

US 2010/0215292 A1    Aug. 26, 2010

(30) Foreign Application Priority Data

Feb. 20, 2009  (FI) ...................... 20095166

(51) Int. Cl.
*B65D 81/34* (2006.01)
*A23B 4/044* (2006.01)
*A23B 4/16* (2006.01)

(52) U.S. Cl.
CPC ............... *B65D 81/34* (2013.01); *A23B 4/044* (2013.01); *A23B 4/16* (2013.01)

(58) Field of Classification Search
CPC ......... A23B 4/044; A23B 4/048; A23B 4/052; A23B 4/0523; A23B 4/0526; A23B 4/056; B65D 81/34
USPC ................ 426/112, 113, 114, 115, 235, 236, 312,426/315, 316, 289, 314; 99/482; 383/38, 109, 383/111
See application file for complete search history.

(56) References Cited

U.S. PATENT DOCUMENTS 1,576,735 A * 3/1926 Fessenden ....................... 426/77
2,633,284 A * 3/1953 McFarland ............. A23L 3/364
    126/369
3,042,532 A * 7/1962 Daline .......................... 426/132
3,248,461 A * 4/1966 Wiles et al. ................. 264/45.4
3,294,227 A * 12/1966 Schneider et al. ............ 206/219
4,141,487 A * 2/1979 Faust et al. .................... 229/120
4,190,677 A * 2/1980 Robins ................ A47J 37/0786
    426/315
4,299,851 A * 11/1981 Lowe ............................ 426/132
4,390,554 A * 6/1983 Levinson ...................... 426/232
4,779,525 A * 10/1988 Gaines ............................ 99/482
4,851,246 A * 7/1989 Maxwell et al. .............. 426/107
4,963,374 A * 10/1990 Brandel et al. ............... 426/107
5,520,940 A * 5/1996 Tirkkonen .................... 426/132

(Continued)

FOREIGN PATENT DOCUMENTS

CA  2302802 A1 * 9/2001
FI     1818        3/1995

(Continued)

OTHER PUBLICATIONS

Definition of "clog." Websters New World Dictionary, Third College Edition. Simon & Schuster 1988.*

(Continued)

Primary Examiner — Viren Thakur
(74) Attorney, Agent, or Firm — Harrington & Smith

(57) ABSTRACT

The invention relates to a product for preparing food, which product is manufactured of heat-resistant, foldable material and into the interior of which product the food is placeable, within the product is arranged one or more intermediate bottoms, between the intermediate bottom and a wall of the product is put material producing gas, and to the intermediate bottom are formed holes for transferring the gas into the interior. In the product according to the invention, the intermediate bottom is releasably fastened at least at the points of the holes in the wall of the product such that it is releasable by means of heating.

8 Claims, 1 Drawing Sheet

(56) References Cited

U.S. PATENT DOCUMENTS

| | | | | |
|---|---|---|---|---|
| 5,962,052 A * | 10/1999 | Acknin et al. | ............... | 426/112 |
| 6,029,567 A * | 2/2000 | Tirkkonen | ............ | A23B 4/044 |
| | | | | 206/524.6 |
| 6,613,378 B1 * | 9/2003 | Erhan et al. | .................. | 426/658 |
| D534,034 S * | 12/2006 | Chambers | ..................... | D7/402 |
| 2002/0166460 A1 * | 11/2002 | O'Shea | ......................... | 99/482 |
| 2006/0153952 A1 * | 7/2006 | Frank | ........................... | 426/129 |
| 2007/0029314 A1 | 2/2007 | Rodgers et al. | ............. | 219/730 |
| 2007/0127853 A1 | 6/2007 | Bezek et al. | ..................... | 383/38 |
| 2009/0053371 A1 * | 2/2009 | Hancock | ...................... | 426/114 |
| 2009/0274799 A1 * | 11/2009 | Lee et al. | ..................... | 426/107 |

FOREIGN PATENT DOCUMENTS

| | | |
|---|---|---|
| FI | 93688 | 12/1995 |
| FI | 98190 | 2/2001 |

OTHER PUBLICATIONS

Definition of "proximate." Webster's New World Dictionary, Third College Edition. Simon & Schuster 1988.*

Hesser, Amanda. "Test Kitchen; Smoke Gets in Your Meat, Not in Your Eyes." Sep. 15, 1999 http://www.nytimes.com/1999/09/15/dining/test-kitchen-smoke-gets-in-your-meat-not-in-your-eyes.html.*

* cited by examiner

PRODUCT OR PREPARING FOOD

The invention relates to a product for preparing food, which product is manufactured of heat-resistant, foldable material and into the interior of which product the food is placeable, within the product is arranged one or more intermediate bottoms, between the intermediate bottom and a wall of the product is put material producing gas, and to the intermediate bottom are formed holes for transferring the gas into the interior.

BACKGROUND OF THE INVENTION

It is known to prepare fish, meat and other foods or foodstuffs by placing them within a product designed for the purpose, closing the product and heating the product. Such a product has readily positioned a required amount of material providing/producing desired flavour, colour and/or aroma when heated. When the foodstuffs are in the closed space, vapour, smoke or equivalent providing flavour, colour and/or aroma develops or enters or is conveyed during heating, whereby this flavour, colour and/or aroma adheres to the foodstuffs.

In some cases, said material producing/providing flavour, colour and/or aroma is put in the same space with the food or foodstuff in question. Then, it is possible that the material in question will lose some of its properties and/or will not work in an anticipated way e.g. when it becomes wet due to food juices. In some other cases, said material producing/ providing flavour, colour and/or aroma is put in an intermediate space which is separate from the space containing the food or foodstuff in question and the intermediate space in question is on the other side of a separate intermediate wall. Then, the intermediate wall includes openings or holes, which permit the material in question to access from the separate space to the same space with the food or foodstuff. Such product is a bag for smoke-curing food, which has been described, inter alia, in Finnish patent 93688.

When the holes or openings in the intermediate wall are open, it is possible that, when food or foodstuff is placed within the product, the juices of the food or foodstuff are able to somewhat access the intermediate space via the openings or holes in the intermediate wall and the material in question loses some of its properties. It is further possible that, if the product is shaken or turned over before placing the food within, the material is sometimes able to access the food space via the openings/holes of the intermediate bottom. It is also possible that if the smell of said material producing/providing flavour, colour and/or aroma is too strong, this smell possibly escapes outside the product during storage and sale and at least when the product is opened and the food or foodstuff is placed within the product.

An object of the invention is to introduce a product for preparing food by means of which disadvantages related to recent products will be eliminated. A particular object of the invention is to introduce a product by means of which food or foodstuff can be cooked and it can be provided with a desired flavouring and colour in a desired way. Furthermore, an object of the invention is to introduce a product the flavourings of which cannot spread in the surroundings.

SUMMARY OF THE INVENTION

The intermediate bottom of the product according to the invention is releasably fastened at least at the points of the holes by means of heating in the product wall. Then, said material producing/providing flavour, colour and/or aroma remains in place and it or its flavouring cannot spread via the holes/openings of the intermediate bottom to the food space or the surroundings.

In an advantageous embodiment of the invention, the intermediate bottom is releasably fastened on at least at the points of the holes in the product wall by means of a fastening component. The fastening component can be any material suitable for the purpose, which can be spread or set between the intermediate bottom and the wall and the properties of which change when heated such that the holes are able to open.

In an advantageous further embodiment of the invention, the intermediate bottom is releasably fastened in the product wall with a solution. The solution is easily spreadable between the layers in the manufacturing stage of the product. By means of the suitable solution, the intermediate wall can be fastened in the product wall such that the intermediate wall at the point and its holes/openings are against the product wall and they are not open.

In an advantageous further embodiment of the invention, the solution is a solution containing sugar. By means of the sugary solution, the intermediate bottom can be suitably fastened against the product wall and, at the same time, the sugar solution functions as a component providing flavour and colour.

DESCRIPTION OF THE DRAWINGS

The invention will now be described in more detail with reference to the accompanying drawing in which.

Figure 1:
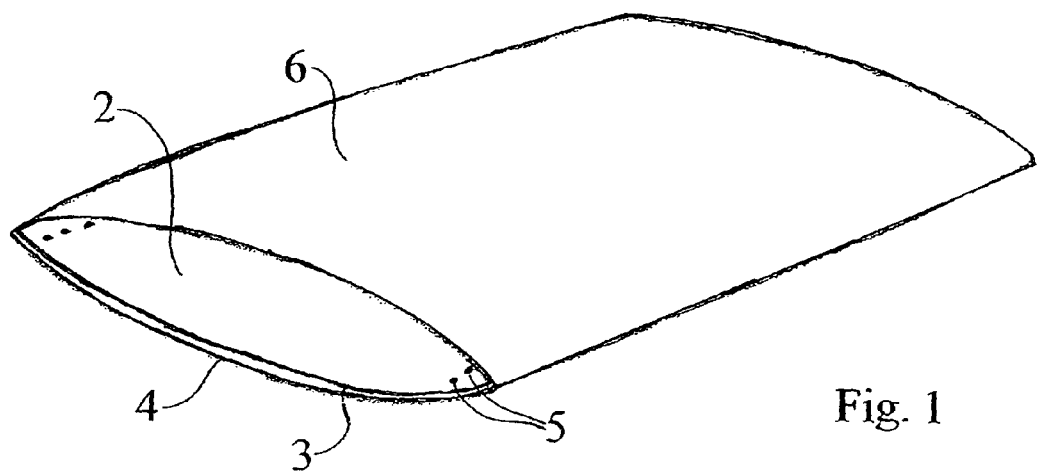
FIG. 1 shows an oblique front view of an embodiment of a product according to the invention when opened for use and a cross-section of a product mouth.

The product according to the figures is a bag 1 manufactured of metal foil or equivalent in a way known as such. It includes three layers: a top 6, an intermediate bottom 3 and a bottom 4. The top and the bottom form the outer walls of the product. The intermediate bottom 3 being an intermediate wall is fastened in the outer walls from its edges. In a space 7 remaining between the intermediate bottom 3 and the bottom wall 4 is put material 8 producing/providing flavour, colour and/or aroma. In an interior space i.e. interior 2 between the intermediate bottom and a top wall 6 is placed food or foodstuff.

The material of the product is heat-resistant material known as such suitable for the product, such as e.g. metal foil or paper coated with metal foil or equivalent. The material is thin, whereby the product is light and cost-effective. The product is foldable, permitting storage in a small space and easy transportation.

The intermediate bottom has been manufactured of the same material as the actual product, but a plurality of holes 5 have been formed to it. The holes are on the sides of the bag and extend parallel with the sides at a small distance from the edges. As the intermediate bottom does not have to endure so much heat as the other product material, it can still be manufactured of thinner material. This gives cost savings in materials and somewhat facilitates the closing of the bag.

When manufacturing a bag according to the figures, sugar or other sweetener or other material suitable for the purpose is spread on top of the bottom as a uniform layer. It is also possible to spread the fastening material only at the point of the holes of the intermediate bottom. Next, suitable material providing additional flavouring, such as e.g. alder tar, some other extract etc., is put on top in a narrow area continuously by drizzling or spraying it abundantly on top of sugar. Last, a thin layer of alder chips is put on top which ties tar and sugar in itself and, at the same time, tar and sugar extract the dust. After this, on top of the bottom is put the intermediate bottom, which is fastened in the bottom foil for its whole width e.g. by rolling it or otherwise ESIM. Then, the sugar solution or other fastening component on the edge totally clogs/fills the holes of the intermediate bottom. The intermediate bottom is thus fastened in the bottom and it endures use well.

The material 8 producing/providing flavour, colour and/or aroma is material intended for the purpose. It can be e.g. wood material, advantageously e.g. hickory or alder crush or other wood material. The wood material is usually within the product as crushed, but it can be used also as e.g. chipped, sliced or in some other form. Furthermore, sugar is usually used among the wood material. In other embodiments of the invention, within the product are put various materials producing flavour or colour or seasonings or equivalents as the material producing gas. It is also possible to put both wood material and other materials providing flavour and/or seasonings within the product.

The material producing gas put within the product is material suitable for the purpose the gas produced by which is non-toxic. When the food has been placed within the product and the product is heated, the material within the product also heats up. Gas produced by it is mixed in the air surrounding the food and absorbed in the food. The inherent flavouring of the foodstuff is still preserved. Through the proper choice of the material put within the product, it is possible to either accentuate the inherent flavour of the food or to season the food with different flavour. The product is suited for preparing various kinds of foodstuffs.

Figure 2:
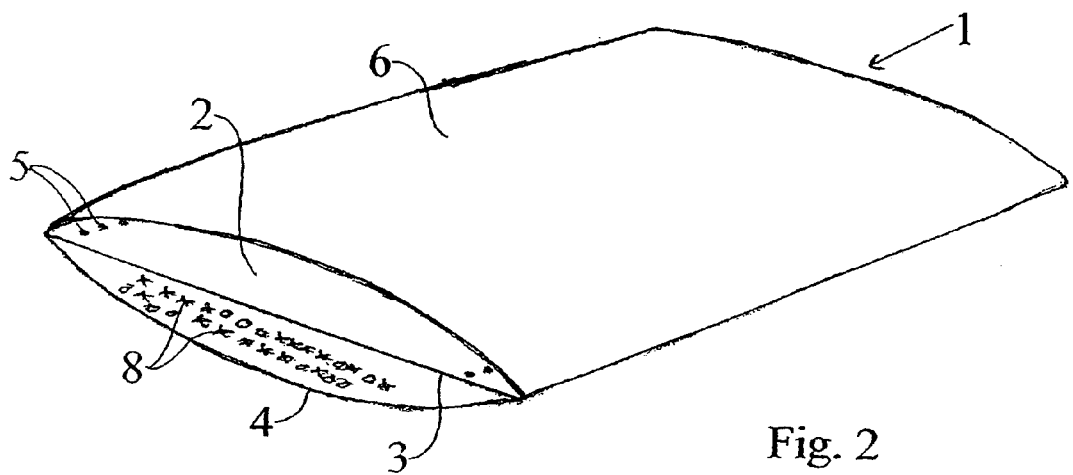
FIG. 2 shows an oblique front view of the product according to FIG. 1 in use during heating and a cross-section of the product mouth and FIG. 3 shows a cross-section of the product according to FIG. 1 during heating.
Figure 3:
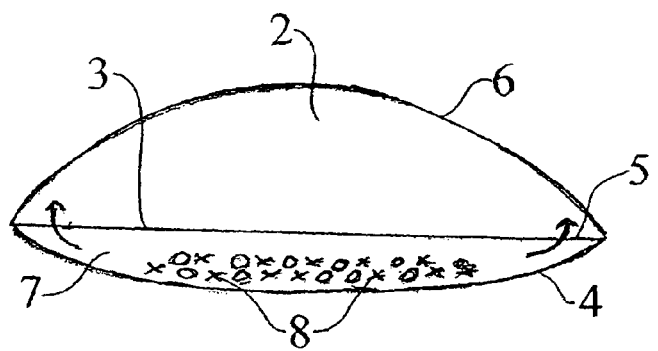

To use the product, the mouth of the bag is opened and its interior is shaped by hand into a desired form thus unfolding the folds. FIG. 1 shows the bag unfolded and shaped. FIG. 1 shows a cross-section of the bag mouth and it shows that the intermediate bottom 3 is against the bottom wall 4 of the bag and the holes 5 are against the bottom wall. Food or foodstuff, such as e.g. fish or meat, is placed on top of the intermediate bottom in the interior 2 i.e. interior space, the mouth of the product is closed tightly e.g. by rolling the mouth and the product is placed over or to the vicinity of open fire, smoldering fire or any other source of heat. As the bag heats up and the temperature rises over 100° C., sugar and/or other fastening components melt and the holes of the intermediate bottom open, whereby vapour or smoke is able to access via the opened holes to the interior i.e. interior space, which contains the food or foodstuff, such as e.g. fish or meat. As the bag heats up and the temperature rises, the material in the intermediate space produces gas, which expands the walls of the intermediate space, whereby, the intermediate bottom and the bag wall move away from each other. Also this assists the freeing of the holes. FIG. 2 shows the bag partially opened and the mouth cross-sectioned, whereby the intermediate space 7 and the material 8 within it are visible. At this stage, the intermediate bottom 3 and the bottom wall 4 are separated, the holes 5 are free and smoke and flavourings are able to access from the intermediate space to the product space. The smoke is able to access the interior i.e. interior space in question in a larger quantity and in a lower temperature than earlier. FIG. 3 shows a cross-section of the bag during heating, whereby gas and flavourings are able to access the interior or interior space 2 and the bag extends from the effect of gas.

After smoke-curing, fish or meat is prepared for serving e.g. by opening the product from the top e.g. using scissors or a knife and by unfolding the edges to the sides. The meat or fish is attractively displayed on top of the intermediate bottom where it can be served.

The invention is not limited to the described advantageous embodiment, but it can vary within the scope of the inventive idea presented in the claims.

The invention claimed is:

1. A product for preparing food, comprising,
   a bag made of a neat-resistant material, said bag having an interior, a closed end, an open end, a top wall and a bottom wall, wherein a food can be placed into the interior,
   an intermediate bottom, which comprises edges, is positioned within the interior of the bag and said intermediate bottom is fastened to the top and bottom wall at said edges; and
   a material that produces a food flavoring gas is positioned between the intermediate bottom and the bottom wall of the bag; and
   the intermediate bottom has holes for transferring gas from the gas producing material into the interior, wherein the holes extend only along sides of the intermediate bottom proximate to the edges of the intermediate bottom, and
   the intermediate bottom is fastened releasably to the bottom wall of the bag only at the holes of said intermediate bottom by a fastening solution that also clogs all the holes, wherein a top side of the intermediate bottom is configured to receive the food and
   the fastening solution is releasable when the fastening solution is heated, and wherein the intermediate bottom is adapted to move away from the wall of the product when the fastening solution is heated.

2. A product according to claim 1, wherein the solution contains sugar.

3. A product according to claim 1, wherein the material that produces a food flavoring gas comprises wood that is positioned between the intermediate bottom and the bottom wall of the bag.

4. A product according to claim 1, wherein the material that produces a food flavoring gas comprises seasoning that is positioned between the intermediate bottom and the bottom wall of the bag.

5. A product according to claim 1, wherein a central area of the intermediate bottom is free of holes.

6. A product according to claim 1, wherein the bag comprises lateral sides extending between the closed end and the open end, wherein the holes extend parallel with the lateral sides.

7. A food preparing product comprising:
   a top wall;
   a bottom wall, the top and bottom wall together form an open end and a closed end;
   an intermediate bottom between the top wall and the bottom wall, where the intermediate bottom comprises holes there-through, wherein the holes extend only along sides of the intermediate bottom proximate edges of the intermediate bottom; and
   a material that produces a food flavoring gas is positioned between the intermediate bottom and the bottom wall, where the top wall, the bottom wall and the intermediate bottom comprise a heat-resistant, foldable material; and between the top wall and the intermediate bottom forms an interior space configured to receive food, and the intermediate bottom is releasably connected to the bottom wall of the product only at the holes of the intermediate bottom by a fastening solution that dogs all the holes, and where the fastening solution is releasable when the fastening solution is heated, to release the connection of the intermediate bottom to the bottom wall of the product to thereby open the holes in the intermediate bottom, and wherein the intermediate bottom is adapted to move away from the wall of the product when the fastening solution is heated.

8. A food preparing product according to claim 7, wherein the food preparing product comprises lateral sides extending between the closed end and the open end, wherein the holes extend parallel with the lateral sides.

* * * * *

UNITED STATES PATENT AND TRADEMARK OFFICE
CERTIFICATE OF CORRECTION

PATENT NO. : 9,567,148 B2  
APPLICATION NO. : 12/660040  
DATED : February 14, 2017  
INVENTOR(S) : Tapani Tirkkonen Page 1 of 1

It is certified that error appears in the above-identified patent and that said Letters Patent is hereby corrected as shown below:

On the Title Page

Item (54) and in the Specification, Column 1, Line 1, Title:
"Product or Preparing Food" should be deleted and --Product for Preparing Food-- should be inserted.

In the Claims

In Claim 1:
Column 4, Line 13, "neat" should be deleted and --heat-- should be inserted.

In Claim 7:
Column 5, Line 5, "dogs" should be deleted and --clogs-- should be inserted.

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*